Patented Aug. 24, 1926.

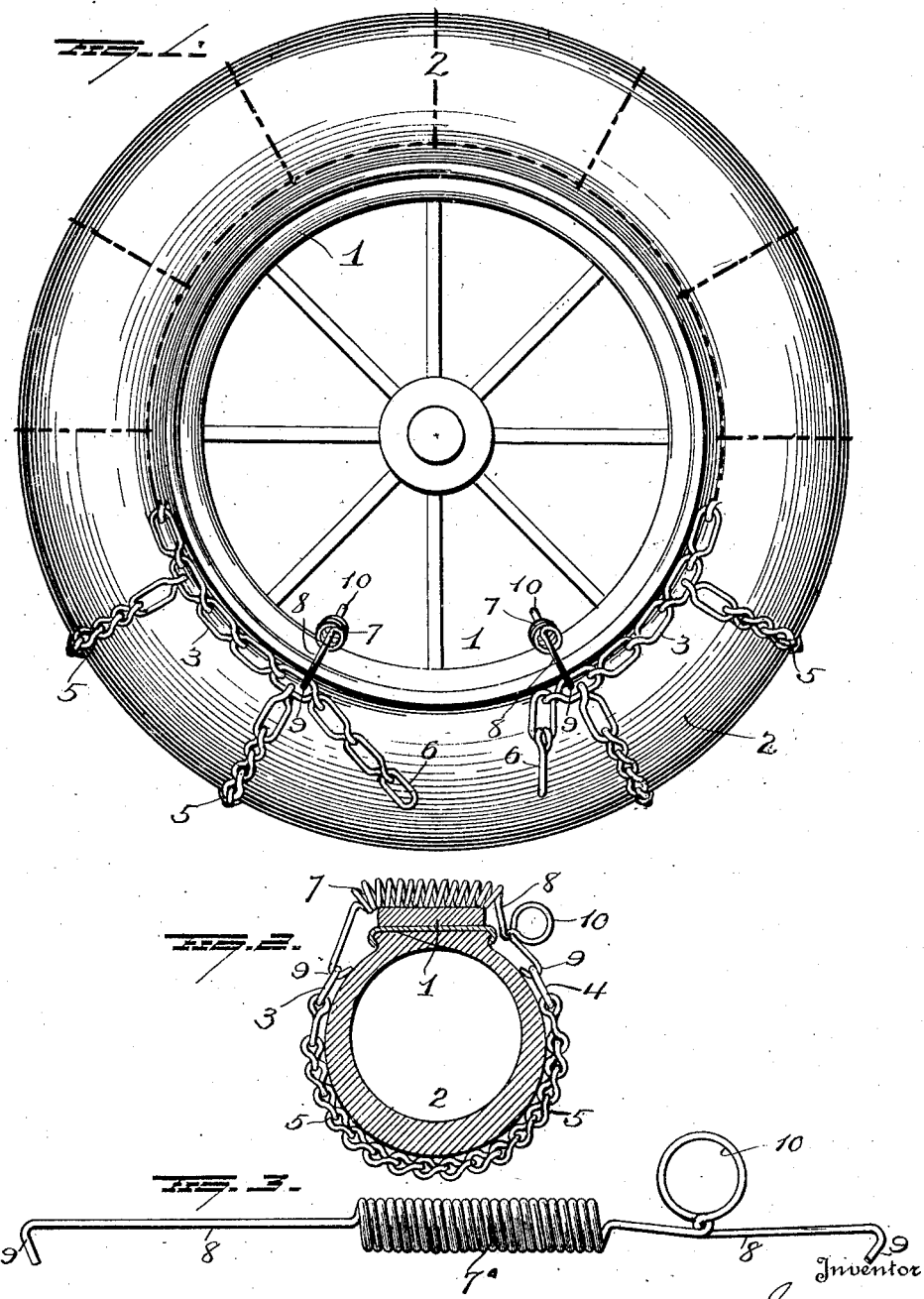

1,597,549

UNITED STATES PATENT OFFICE.

ANDREW W. SIEGEL, OF WILLIAMSPORT, PENNSYLVANIA.

TIRE CHAIN.

Application filed June 11, 1925. Serial No. 36,445.

This invention relates to holding tools for facilitating the application of anti-skid devices to tires. These anti-skid devices, generally called "tire-chains", consist of parallel chains intended to extend circumferentially of the tire and connected at intervals by transverse chains arranged to extend across the tread of the tire. The length of the circumferential chain is less than the periphery of the tire and the fastening devices, with which the ends of the chains are equipped, cannot be united until the entire chain has been applied and the ends brought into proximity. The application of the chains requires the wheel to be jacked up from the ground, or the vehicle to be driven so that the wheel will roll onto a chain spread upon the ground, or resort be had to other vexatious, slow and laborious expedients. The object of the present invention is to provide a very simple and inexpensive device whereby the tire chain end portions may be held to the tire, after being merely placed circumferentially thereon to facilitate the coupling of the chain ends.

The invention is illustrated in the accompanying drawings and consists in certain novel features which will be hereinafter first fully described and then particularly pointed out in the appended claims.

In the drawings, Figure 1 is a side elevation of a wheel showing the application of the invention.

Figure 2 is a transverse section, and

Figure 3 is a detail of the attaching tool or device.

The wheel 1 with its pneumatic tire 2 may be of any approved form having spokes. 3 and 4 designate the circumferential members of a tire chain and 5 designates the transverse tread members connecting the parallel circumferential members at intervals, the fastening devices at the ends of the circumferential members being indicated at 6.

In accordance with the present invention, I provide chain holding tools 7, each comprising a contractile coiled spring $7^a$, or other elastic member, having its ends extended, as shown at 8, and terminating in hooks 9. One end extension 8 is provided with a ring or loop 10 constituting a finger hold or handle, formed preferably by doubling or twisting the wire upon itself, as shown.

In the practical use of the device or tool, the tire chain may be placed upon the wheel with the circumferential members extending downwardly on each side from the highest point of the wheel, the transverse connecting members passing across the tread of the tire. Then the operator engages a finger through the ring 10 of the tool and inserts one end extension through the space between two spokes of the wheel and engages the hook 9 in a link of the inner parallel member of the tire chain. He then exerts sufficient pull upon the tool to engage the outer hook 9 in a link of the outer parallel member of the chain so that one depending end portion of the chain will be caused to embrace the tire. If the grip upon the tool be now released, the spring 7 will contract and hold the tire chain end portion closely against the tire. The other depending end portion of the chain will be held in place in the same manner with the use of another tool constructed and applied in the same manner as previously explained, and the application of the chain to the tire will appear as indicated in Figure 1. The members 6 may now be readily and conveniently brought together and permanently coupled, after which the holding tools 7 will be removed. If desired, the wheel may be slightly rotated by running the car forwardly a short distance, before permanently coupling the free end links or members 6 and removing the temporary holding tools.

The tool or device can be produced at such a low cost that a motorist can well afford to carry a set of two or four, and be enabled to quickly apply the chains to the driving wheels. It is to be particularly noted that the provision of the finger ring or loop permits the user to obtain a strong grip upon the tool or device without discomfort and enables him to overcome the tension of the spring and engage the hooks in the chain members without laborious effort. It will be obvious from an inspection of the drawing that the device is formed from a single strand of tempered wire of proper diameter, and is, therefore, free of joints which are liable to open and destroy the efficiency of the device or tool.

Having fully described my invention what I claim as new and desire to secure by Letters Patent, is:

1. A tire holding tool, comprising a contractile coiled spring, end members extending from the spring and terminating in chain-engaging hooks, and a finger ring on one end portion.

2. A tire chain holding tool comprising an integral connector consisting of wire having its intermediate portion coiled to form a contractile spring portion and having end portions extending from the ends of the spring portion and terminating in chain-engaging hooks, one end portion having a finger ring thereon.

3. A tire chain holding tool comprising an integral connector consisting of wire having its intermediate portion coiled to form a contractile spring portion and having end portions extending from the ends of the spring portion and terminating in chain-engaging hooks, one of said end portions bent between its end to form a finger ring.

In testimony whereof, I have signed this specification.

ANDREW W. SIEGEL.